United States Patent [19]
Englund

[11] 3,742,460

[45] June 26, 1973

[54] SEARCH MEMORY

[75] Inventor: Robert M. Englund, Golden Valley, Minn.

[73] Assignee: Sperry Rand Corporation, New York, N.Y.

[22] Filed: Dec. 20, 1971

[21] Appl. No.: 209,963

[52] U.S. Cl. .............................. 340/172.5, 340/173

[51] Int. Cl. ............................................ G11c 15/00

[58] Field of Search .................. 340/172.5, 173 AM

[56] References Cited

UNITED STATES PATENTS

| | | | |
|---|---|---|---|
| 3,387,274 | 6/1968 | Davis | 340/172.5 |
| 3,416,146 | 12/1968 | Bremer | 340/172.5 |
| 3,387,272 | 6/1968 | Evans et al. | 340/172.5 |
| 3,456,243 | 7/1969 | Cass | 340/172.5 |
| 3,573,756 | 4/1971 | Hillis et al. | 340/172.5 |

*Primary Examiner*—Raulfe B. Zache
*Assistant Examiner*—John P. Vandenburg
*Attorney*—Kenneth T. Grace et al.

[57] ABSTRACT

A Search memory organization using as the designator words, which words are the words that are stored in the Search memory and that are compared to the one search word held in the search register, words that are generated from blocks of data words is disclosed. Each of the (block) designator words includes two portions: a first common portion that includes the binary data that are common to all the data words of the block; and, a second word portion that includes the binary data that are not common to all the data words of the block. Thus, all the data words in each block are represented by only a single block designator word whereby only one block designator word need be searched for comparison to the one search word rather than all the data words of the block.

4 Claims, 7 Drawing Figures

| SW INPUT | BDW FF | SM OUTPUT | SEARCH |
|---|---|---|---|
| H⇛ 0 | H⇛ 0 | 1 | MATCH |
| H⇛ 1 | H⇛ 1 | 1 | MATCH |
| H⇛ 0 | H⇛ 1 | 0 | NO MATCH |
| H⇛ 1 | H⇛ 0 | 0 | NO MATCH |

| SW INPUT | BDW FF | SM OUTPUT | SEARCH |
|---|---|---|---|
| H ⇏ 0 | H ⇏ 0 | 1 | MATCH |
| H ⇏ 1 | H ⇏ 1 | 1 | MATCH |
| H ⇏ 0 | H ⇏ 1 | 1 | MATCH |
| H ⇏ 1 | H ⇏ 0 | 0 | NO MATCH |

SEARCH MEMORY

BACKGROUND OF THE INVENTION

A block search processor for performing the search function block-by-block in a multiblock Search memory system has been disclosed in the W. Davis U.S. Pat. No. 3,387,274. In this Search memory arrangement the Search memory is broken down into a plurality of equal-size blocks in which the search operation is simultaneously performed on all the words in a designated block, the search operation results are then detected and any designated operation is performed, the next designated block is then searched, the search operation results are then detected and any designated operation is performed, and so forth though the Search memory. This prior art block Search memory arrangement provides a reduction in the required number of sense amplifiers and match logic detectors that is an inverse function of the number of blocks into which the Search memory is divided. The present invention further reduces the hardware associated with the Search memory function requiring essentially only the addition of an encoder for encoding the W-bit binary coded data of the word portion of the one search word held in the search register into a one-of-C code for searching the word portion of a plurality of block designator words held in the Search memory.

BRIEF SUMMARY OF THE INVENTION

The block search processor of the present invention involves a method of converting all the words of a block of data words into a single block designator word. A plurality of such block designator words are then assembled in a Search memory and a search operation is performed in a well-known manner. The words of each block may be consecutively numbered data words representing arithmetic constants or memory addresses; however, all the words of each block have two portions: a first common portion of N-bits that include the binary data that is common to all the words of the block; and, a second uncommon or word portion of W-bits that is not common to any other word of the block.

The data words are firstly collated into a plurality of blocks according to their common portions. All the data words of each block are then converted into a single block designator word which has two portions, a first common portion of N-bits that is identical to the common portion of the data words that make up the block; and, a second coded portion of C-bits in which the binary coded word portion of W-bits of the data words that make up the block are encoded into 1-of-C binary code in which the decimal equivalent of the binary coded word portion is represented by a single 1-bit placed in the equivalent decimal-ordered bit position. Table A illustrates one example of this collation and conversion technique in which 16 data words, each of 12 bits in length are collated into three blocks each of 4, 4 and 8 data words. The data words of each block are then converted into a single block designator word having a coded portion of C decimal-ordered bits 0–7, the respective bit positions, by the use of a 1-bit, representing the decimal equivalent of the binary coded word portion of W-bits of each respective data word; $C=2^W$, i.e., where the binary coded word portion of each data word is 3-bits in length, then the coded portion of the block designator word is 8-bits in length (bits 0–7).

BRIEF DESCRIPTION OF THE PREFERRED EMBODIMENT

Figure 1:
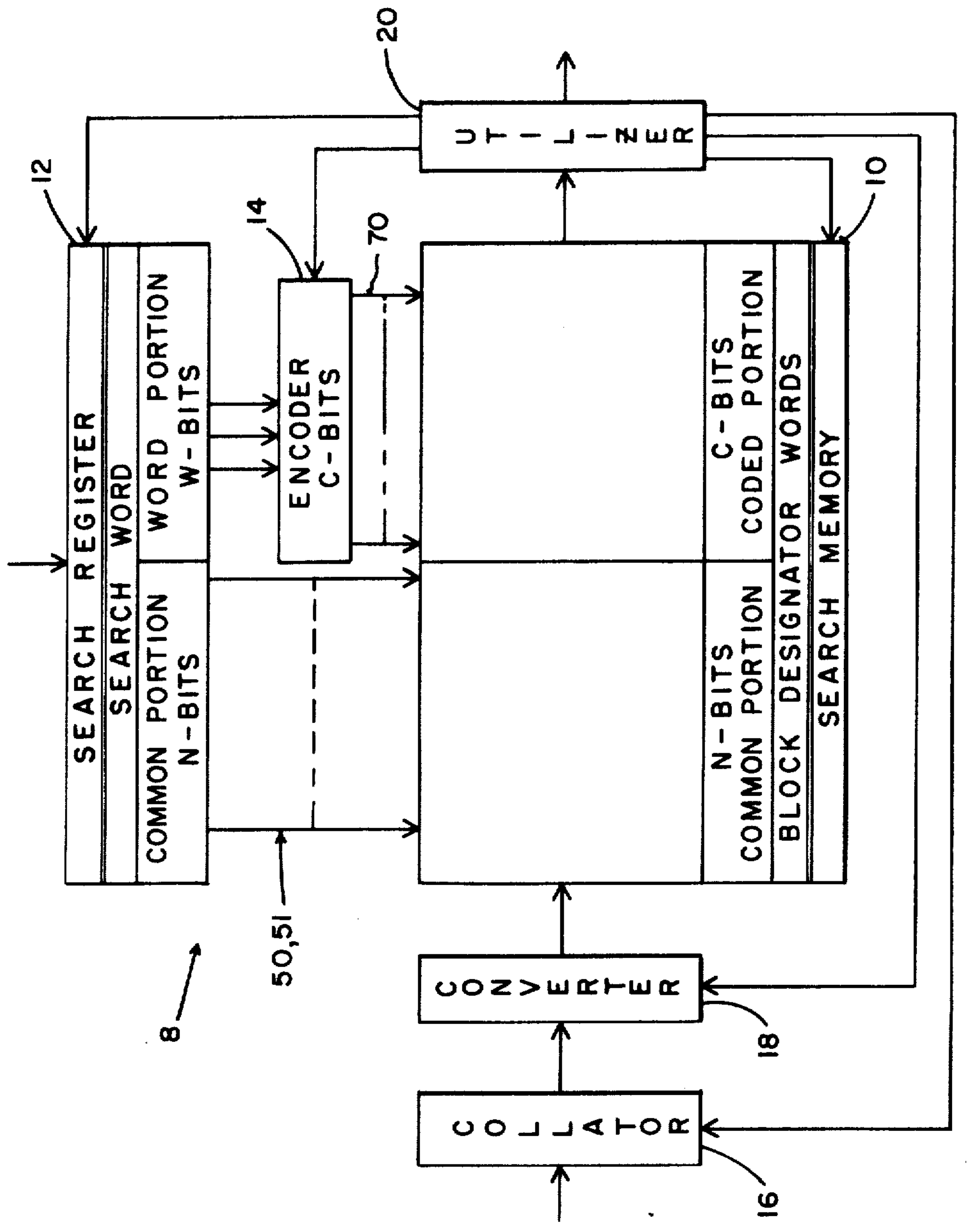
FIG. 1 is a block diagram of a block search processor incorporating the present invention.

With particular reference to FIG. 1 there is presented a block search processor 8 incorporating the present invention. Block search processor 8 includes: a Search memory 10 in which are stored a plurality of block designator words, each having a common portion of N-bits and a coded portion of C-bits; a search register 12 in which is stored the search word, having a common portion of N-bits and a word portion of W-bits, that is to be compared to the block designator words held in Search memory 10; an encoder 14 that encodes the W-bits of the word portion of the search word into a 1 of C binary code; a collator 16 for grouping or collating a plurality of data words according to their common portions of N-bits; a converter 18 for generating a block designator word for each group of data words that is collated by collator 16; and, a utilization means 20 which may include a word organized memory for operating upon the match/mismatch output of Search memory 10.

Figure 2:
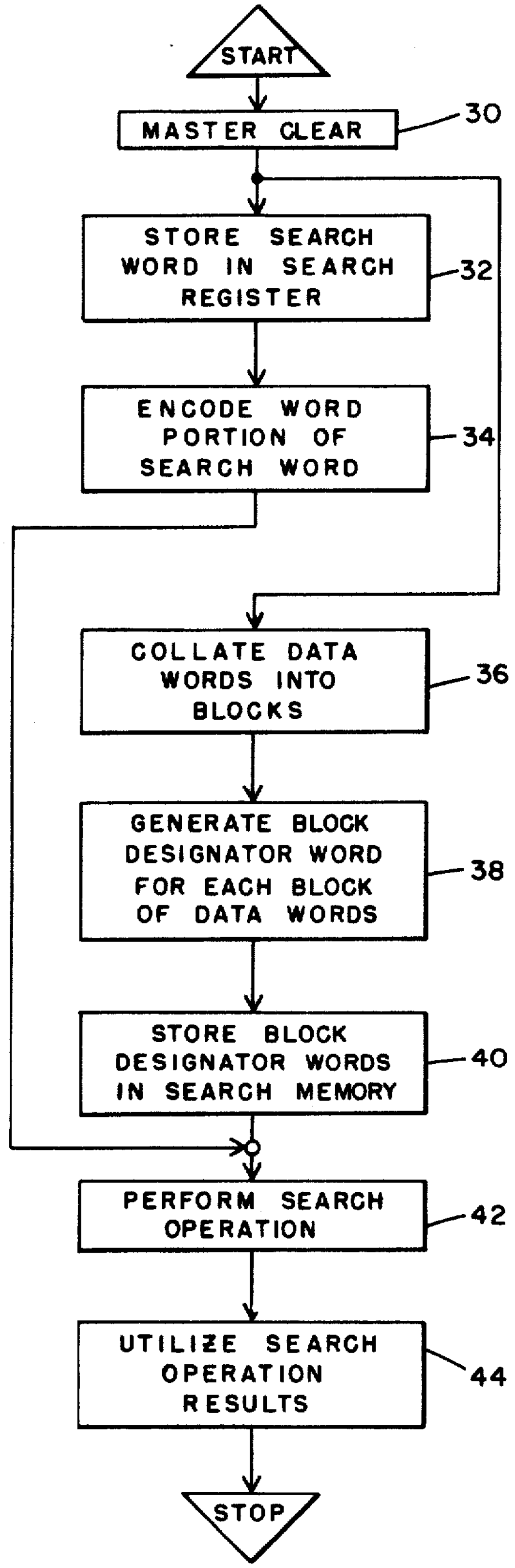
FIG. 2 is an illustration of a flow diagram depicting the method of operation of the block search processor of FIG. 1.

With particular reference to FIG. 2 there is presented a flow diagram of a search operation that is implemented by the block search processor 8 of FIG. 1. Initially the search operation is started by utilization means 20 coupling appropriate signals to the associated components of block search processor 8 including master clearing the registers and components thereof associated therewith as designated by Function Operation block 30. Next, a search word is loaded into search register 12 as designated by Function Operation block 32 with the word portion of the search word held in search register 12 being encoded by encoder 14 as designated by Function Operation block 34. Concurrently with the loading of the search word in search register 12 and the encoding of the word portion thereof by encoder 14, all the data words upon which the search operation is to be performed are grouped or collated into groups as designated by Function Operation block 36. Next, converter 18 operates upon the collated data words generating a block designator word for each group of data words as designated by Function Operation block 38. Next, the block designator words are stored in Search memory 10 as designated by Function Operation block 40. Next, the search operation as designated by Function Operation block 42 is initiated:

The common portion of the search word in search register 12 is compared bit-by-bit to the common portion of each of the block designator words in Search memory 10; and, the coded portion generated by encoder 14 from the word portion of the search word in search register 12 is compared bit-by-bit to the coded portion of each of the block designator words in Search memory 10; whereby, the match/mismatch output signal(s) is generated.

Next, the search operation result(s) as represented by the match/mismatch output signal(s) is coupled to and utilized by utilization means 20 as designated by Function Operation block 44.

To better understand the above described generalized operation of block search processor 8 of FIG. 1 a more detailed discussion thereof will be had following a step-by-step operation upon a plurality of data words as listed in Table A.

Initially, assume that the following multibit search word of 12-bits is given

101011101011 and that it is to be compared to the 16 data words listed in Table A. Such 16 data words are, as described above, initially collated into three groups of data words in which all the data words of each group have a common portion of N-bits that includes the binary data that is common to all the words of the block and a word portion that is not common to any other word of the block. Additionally, as a necessary limitation, the common portions of all of the data words of all the blocks are of the same number of bits, i.e., N-bits in length, and the word portions of all the data words of all the blocks are of the same number of bits, i.e., W-bits in length. Note - assuming that all such words are arranged with their right-hand digit being the lease significant digit and the left-hand digit being the most significant digit all such words could be normalized such that all such words have the same number of digits, i.e., 12, by merely filling the left-hand digit positions with 0's. Following this procedure the listed 12 data words are collated into three blocks 1, 2, 3 comprising 4, 4, 8 data words, respectively. Next, the three blocks of data words are successively coupled to converter means 18 which converts all the data words of each block to a single associated block designator word. Each block designator word has a common portion of N-bits that is identical to the common portion of all the data words that make up the associated block and a coded portion of C-bits. The coded portion of the block designator word is generated from the word portion of all the data words of the associated block in which the decimal equivalent of the binary coded word portions are represented by a single 1-bit placed in the equivalent decimal-ordered bit position. As an example, the word portion of the first word of block 1 as noted in Table A is the binary coded sequence

000 which is equivalent to the decimal number 0. Accordingly, a 1-bit is placed in the 0 decimal-ordered bit position of the coded portion of the block designator word associated with all the data words of block 1.

Next, the three block designator words are entered into Search memory 10. The search word in search register 12 then has the 9-bits of its common portion

101011101 coupled bit-by-bit to the associated like-ordered bits of the common portions of the block designator words while encoder 14 encodes the binary coded word portion

011 of the search word into a coded portion

00010000 which 8-bits are in turn coupled bit-by-bit to the associated like-ordered bits of the coded portions of the three block designator words. The search function being, e.g., an equality search determines a match find with the block designator word of block 2 which through decoder and utilization means 20 or which within Search memory 10 identifies the associated match find to be the second data word of block 2.

TABLE A

| | Data words | | Block designator words | | | | | | | | |
|---|---|---|---|---|---|---|---|---|---|---|---|
| | | | | Coded portion | | | | | | | |
| Block | Common portion | Word portion | Common portion | 0 | 1 | 2 | 3 | 4 | 5 | 6 | 7 |
| 1 | 101011100 | 000 | | 1 | | | | | | | |
| | 101011100 | 010 | | | | 1 | | | | | |
| | 101011100 | 011 | | | | | 1 | | | | |
| | 101011100 | 100 | | | | | | 1 | | | |
| | | | 101011100 | 1 | 0 | 1 | 1 | 1 | 0 | 0 | 0 |
| 2 | 101011101 | 001 | | | 1 | | | | | | |
| | 101011101 | 011 | | | | | 1 | | | | |
| | 101011101 | 101 | | | | | | | 1 | | |
| | 101011101 | 111 | | | | | | | | | 1 |
| | | | 101011101 | 0 | 1 | 0 | 1 | 0 | 1 | 0 | 1 |
| 3 | 101011111 | 000 | | 1 | | | | | | | |
| | 101011111 | 001 | | | 1 | | | | | | |
| | 101011111 | 010 | | | | 1 | | | | | |
| | 101011111 | 011 | | | | | 1 | | | | |
| | 101011111 | 100 | | | | | | 1 | | | |
| | 101011111 | 101 | | | | | | | 1 | | |
| | 101011111 | 110 | | | | | | | | 1 | |
| | 101011111 | 111 | | | | | | | | | 1 |
| | | | 101011111 | 1 | 1 | 1 | 1 | 1 | 1 | 1 | 1 |
| | N bits | W bits | N bits | C bits | | | | | | | |

Figure 3:
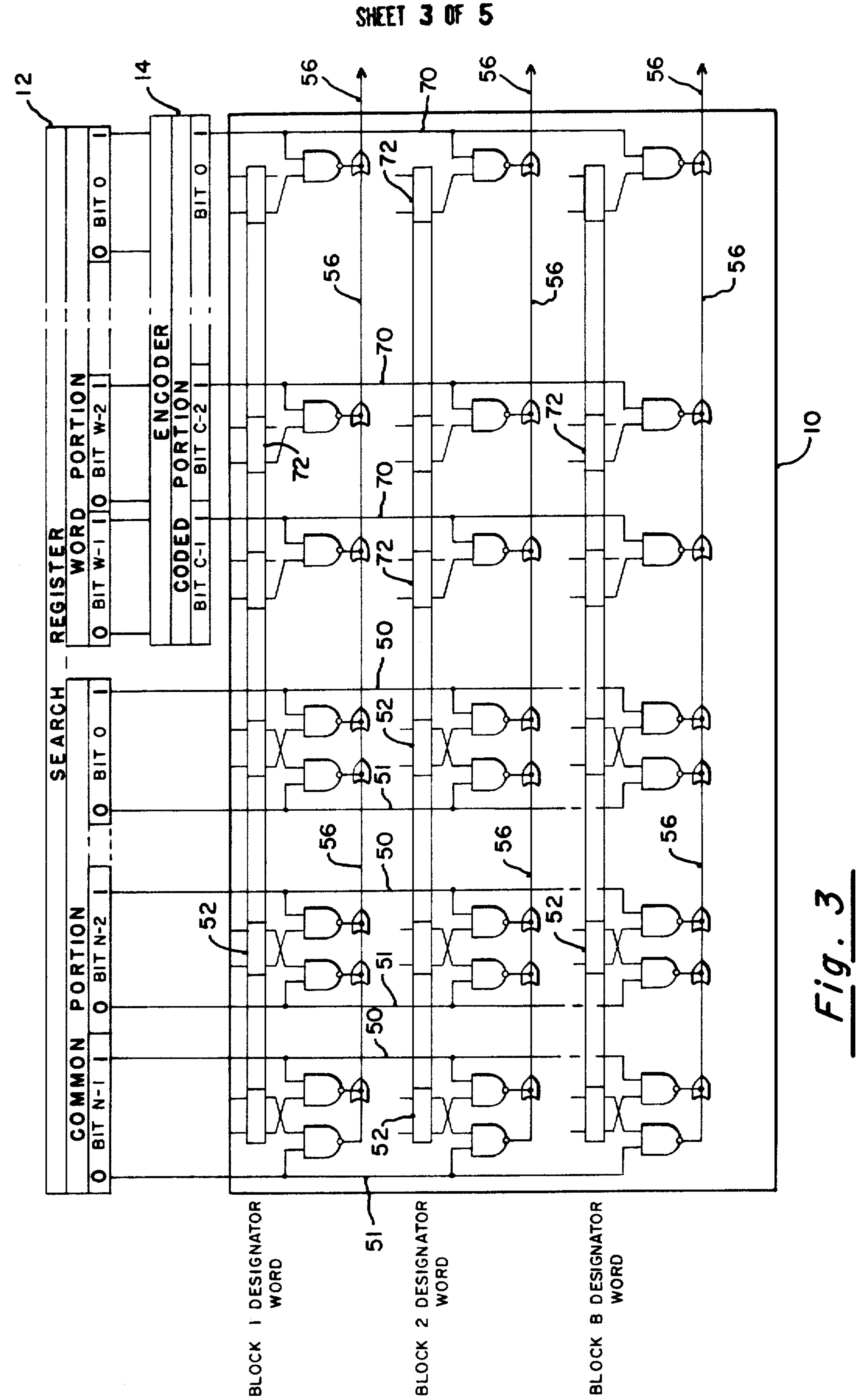
FIG. 3 is a block diagram of the internal block designator word registers of the Search memory of FIG. 1.
Figures 4A, 4B:
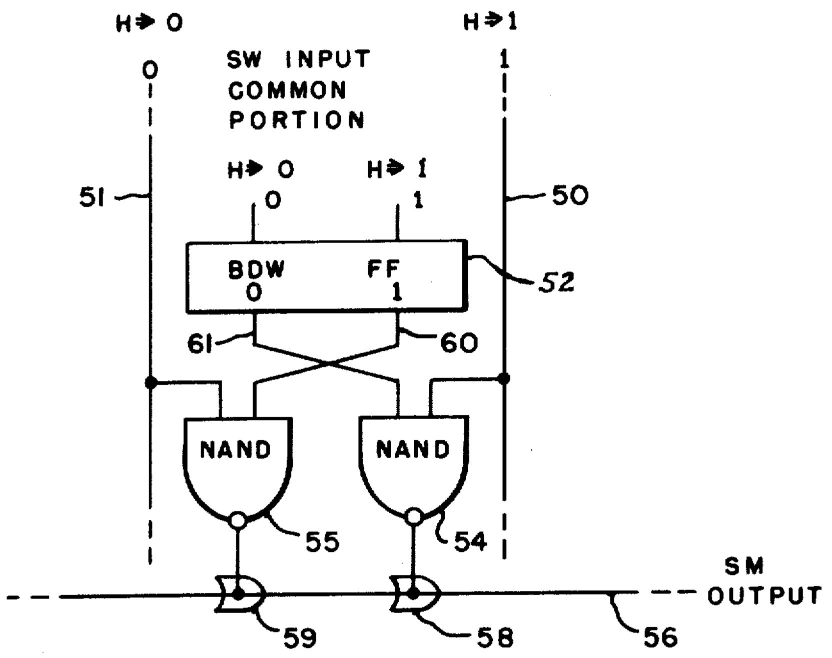
FIGS. 4*a*, 4*b* are the circuit diagram and the truth table, respectively, of the circuits associated with the block designator word common portions.

With particular reference to FIG. 3 there is presented an illustration of a block diagram of the internal block designator word registers of Search memory 10 that could perform the search function described above. In FIG. 3 there are utilized two logic circuits: FIG. **4*a* which is associated with the search word (SW) common portion input and the associated truth table of FIG. 4*b*; and FIG. 5*a*** that is associated with the search word (SW) coded portion input and the associated truth table of FIG. 5*b*. In FIG. 4*a*, both the true and the complement search word input (SW INPUT) of the associated bit of the common portion of the search word in search register 12 are coupled to true line 50 and complement line 51, respectively, while the associated bit from the associated block designator word is loaded into block designator word flip-flop (BDW FF) 52 in the usual manner. Each of the outputs of the two positive NAND circuits 54, 55 and Search memory 10 output line (SM OUTPUT) 56 form a wired negative OR circuit 58, 59, respectively. As noted in the truth table of FIG. 4*b*, when both SW INPUT and BDW FF are of the same logic level (both 1's or both 0's) i.e., the signal on lines 50 and 60 or on lines 51 or 61 are both high potential (H), the Search memory 10 output (SM OUTPUT) is a logic 1 (H ⇒ 1) signifying a match condition. Utilizing the wired ORs 58, 59, a mismatch of any one bit of the common portion of the search word and of the block designator word "locks out" any effect of the comparison of the coded portions of the search word and of the block designator words, i.e., prevents the SM OUTPUT on line 56 from indicating a H ⇒ 1 or a match find.

Figures 5A, 5B:
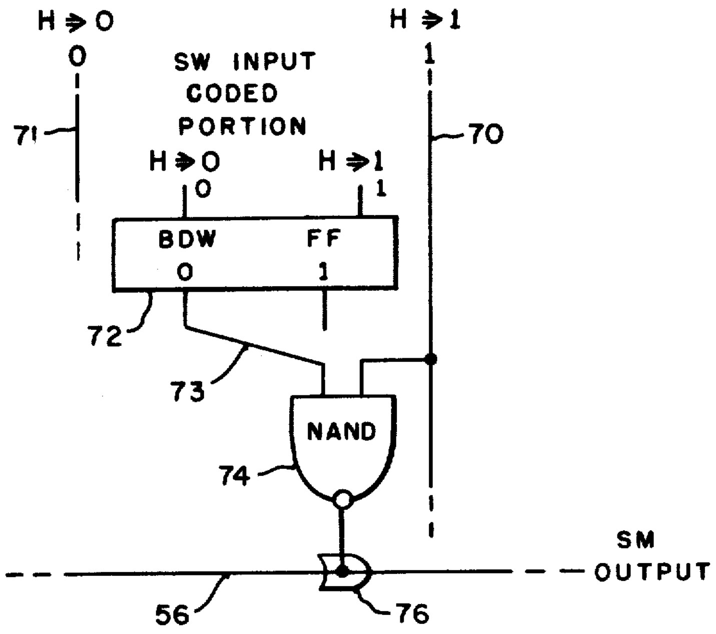
FIGS. 5*a*, 5*b* are the circuit diagram and truth table, respectively, of the circuits associated with the block designator word coded portions.

In FIG. 5*a* only the true search word input (SW INPUT) from the associated bit of the coded portion of the search word in search register 12 are coupled to true line 70 while the associated bit of the associated block designator word is loaded into block designator word flip-flop (BDW FF) 72 in the usual manner. The output of a single positive NAND 74 and Search memory 10 output line (SM OUTPUT) 56 (same as in FIG. 4*a*) form a wired negative OR 76 as in FIG. 4*a*. As noted in the truth table of FIG. 5*b*, a mismatch is only determined when SW INPUT line 70 is a logic 1 (H ⇒ 1) and BDW FF 72 is a logic 0 (H ⇒ 0), for the complement SW INPUT line 71 is not utilized. If all of the C-bit SW INPUT signals on true lines 70 from encoder 14—see FIG. 1— are a logic 0 (L ⇒ 0) the effect is to mask the coded portions of the block designator words in Search memory 10 and to perform the search operation only on the N-bits of the common portions of such block designator words. This is in contrast to the normal search operation in which one and only one of the C-bits from encoder 14 is a logic 1 (H ⇒ 1).

With reference back to FIG. 3, with the single search word held in search register 12 and with the B block designator words stored in Search memory 10 the N-bits and the C-bits of the common and uncommon or coded portions (from encoder 14), respectively, of the search word are coupled in parallel (each bit in the search word is coupled in serial to each of the like-ordered bits of all block designator words) to the like-ordered bits, i.e., block designator word flip-flop BDW FF 52, 72, of the like portions of the block designator words. As discussed above with particular reference to FIGS. 4*a*, 4*b*, 5*a*, 5*b* a mismatch of any one bit of the common portion of the search word in a particular block designator word 1, 2 . . . B locks out any match signal from the associated coded portions while a match of any one bit of the coded portion of the search word with the coded portion of a particular block designator word (with a match of the common portion of the search word and the block designator word) provides a match output signal on the associated SM OUTPUT line 56.

What is claimed is:

1. The method of performing a block search upon a plurality of data words, comprising:

assembling a plurality of data words, each of said data words comprising two portions of ordered bits;
- a first common portion of ordered N-bits in length; and,
- a second word portion of ordered W-bits in length;

generating a lesser plurality of block designator words from a greater plurality of said data words, each of said block designator words comprising;
- a first common portion of ordered N-bits in length that includes binary data that are common to all the data words represented by said block designator word;
- a second coded portion coded into a 1-of-C code of ordered C-bits in length, only one C-bit coded for identifying a separate one of all the data words that are represented by said block designator word;

storing in a search register a single search word comprising;
- a first common portion of ordered N-bits in length; and,
- a second word portion of ordered W-bits in length;

storing in a Search memory said plurality of block designator words;

encoding the ordered W-bits of the second word portion of said search word into an ordered 1-of-C code of C-bits in length;

coupling each separate one of the ordered N-bits of the common portion of said search word in said search register to each separate like-ordered one of the like-ordered N-bits of the common portion of the block designator words in said Search memory;

coupling each separate one of the ordered C-bits of said ordered 1-of-C code of the encoded portion of said search word to each separate like-ordered one of the like-ordered C-bits of said ordered 1-of-C code of the second coded portion of the block designator words in said Search memory;

comparing bit-by-bit each separate one of the like-ordered N-bits of the first common portion of the search word to each separate like-ordered one of the like-ordered N-bits of the first common portion of the block designator words in said Search memory;

comparing bit-by-bit each separate one of the like-ordered C-bits of the ordered 1-of-C code of the encoded portion of said search word to each separate like-ordered one of the ike-ordered C-bits of the ordered 1-of-C code of the second coded portion of the block designator words in said Search memory;

generating match/mismatch signals indicating the results of said bit-by-bit comparison.

2. The method of claim 1 further comprising:

locking out the bit-by-bit comparison of the like-ordered C-bits of the ordered 1-of-C code of the encoded portion of said search word with the like-ordered C-bits of the ordered 1-of-C code of the encoded portion of any one of said block designator words in said Search memory if the bit-by-bit comparison of the like-ordered N-bits of the first common portion of said search word determines a mismatch of any one of the like-ordered N-bits of the first common portion of said one block designator word in said Search memory.

3. A block search processor, comprising:
a search register for storing a single search word comprising two portions of ordered bits;
a first common portion of ordered N-bits in length; and,
a second word portion of ordered W-bits in length;
encoder means for encoding the W-bits of the word portion of said search word into a 1-of-C code of ordered C-bits in length;
a Search memory for storing a plurality of block designator words, each block designator word associated with a block of data words and comprising two portions of ordered bits;
a first common portion of ordered N-bits in length that includes the binary data that is common to all the data words of the block; and,
a second word portion coded into a 1-of-C code of ordered C-bits in length, only one ordered C-bit coded for identifying a separate one of the data words of the block;
each separate block designator word having a separately associated Search memory output line for providing as outputs thereof match/mismatch signals that indicate the results of a bit-by-bit comparison of the ordered bits of said search word to the like-ordered bits of each of said block designator words;
means for coupling each separate one of the ordered N-bits of the common portion of said search word in said search register to each separate like-ordered one of the like-ordered N-bits of the common portion of the block designator words in said Search memory; and,
means for coupling each separate one of the ordered C-bits from said encoder means to each separate like-ordered one of the like-ordered C-bits of the coded portions of the block designator words in said Search memory.

4. The block search processor of claim 3 wherein:
each of the true of each of the ordered N-bits of the common portion of said search word in said search register and each of the complement of the like-ordered bits of the ordered N-bits of the common portion of each of said block designator words in said Search memory are coupled to a separately associated NAND gate and thence to the one associated block designator word Search memory output line;
each of the complement of each of the ordered N-bits of the common portion of said search word in said search register and each of the true of the like-ordered bits of the ordered N-bits of the common portion of each of said block designator words in said Search memory are coupled to a separately associated NAND gate and thence to the one associated block designator word Search memory output line;
only the true of each of the ordered C-bits from said encoder means and only the complement of each of the like-ordered bits of the ordered C-bits of the coded portion of each of said block designator words in said Search memory are coupled to a separately associated NAND gate and thence to the one associated block designator word Search memory output line.

* * * * *